US012632501B1

(12) United States Patent
    Le et al.

(10) Patent No.:    US 12,632,501 B1
(45) Date of Patent:      May 19, 2026

(54) FINE-TUNING CLASSIFICATION AND DOMAIN-SPECIFIC TAXONOMICAL HIERARCHY IN RETRIEVAL-AUGMENTED GENERATION PIPELINES

(71) Applicant: Stretto, Inc., Irvine, CA (US)

(72) Inventors: James M. Le, Huntington Beach, CA (US); Robert Klamser, Denver, CO (US); George Tsounis, Overland Park, KS (US); Randall Reese, Chicago, IL (US); Ray Guo, Rancho Santa Margarita, CA (US)

(73) Assignee: STRETTO, INC., Irvine, CA (US)

( * ) Notice: Subject to any disclaimer, the term of this patent is extended or adjusted under 35 U.S.C. 154(b) by 0 days.

(21) Appl. No.: 19/003,829

(22) Filed: Dec. 27, 2024

(51) Int. Cl.
    *G06F 16/903*     (2019.01)
    *G06F 16/9035*     (2019.01)
    *G06F 16/906*     (2019.01)

(52) U.S. Cl.
    CPC .... *G06F 16/90335* (2019.01); *G06F 16/9035* (2019.01); *G06F 16/906* (2019.01)

(58) Field of Classification Search
    CPC ........... G06F 16/90335; G06F 16/9035; G06F 16/906
    See application file for complete search history.

(56) References Cited

U.S. PATENT DOCUMENTS

2024/0289559 A1 *   8/2024   Gajek ................... G06F 40/289
2024/0311563 A1 *   9/2024   Somech ............... G06F 40/295

* cited by examiner

*Primary Examiner* — Charles Rones
*Assistant Examiner* — Xiaoqin Hu
(74) *Attorney, Agent, or Firm* — BRYAN CAVE LEIGHTON PAISNER LLP

(57)      ABSTRACT

A computer-implemented method including receiving a query from a user related to legal information. The method also can include performing an initial retrieval of document chunks from a corpus of legal documents. The method additionally can include applying a cross-encoder model to generate relevance scores for the document chunks. The method further can include filtering the document chunks based on a quality threshold. The method additionally can include calculating a combined score for each remaining document chunk of the document chunks based on a respective relevance score of the relevance scores, temporal relevance score, and a document type importance score. The method also can include selecting a subset of top-scoring document chunks based on the combined score. The method additionally can include generating a response to the query based on the subset of the top-scoring document chunks.

20 Claims, 5 Drawing Sheets

400

405

| Retrieve new documents to add to the corpus |
| :---: |
| 505 |

| Classify the new documents based on type |
| :---: |
| 510 |

| Divide the new documents into new document chunks. |
| :---: |
| 515 |

FINE-TUNING CLASSIFICATION AND DOMAIN-SPECIFIC TAXONOMICAL HIERARCHY IN RETRIEVAL-AUGMENTED GENERATION PIPELINES

TECHNICAL FIELD

This disclosure relates generally to fine-tuning classification and domain-specific taxonomical hierarchy in retrieval-augmented generation pipelines.

BACKGROUND

Artificial intelligence systems are increasingly being applied in various industries, including the legal sector, to enhance efficiency and productivity. These systems, particularly in legal research and document analysis, aim to assist professionals with complex tasks by providing rapid access to vast amounts of information. Despite their potential benefits, AI applications in legal contexts face unique challenges due to the nuanced and context-dependent nature of legal information.

BRIEF DESCRIPTION OF THE DRAWINGS

To facilitate further description of the embodiments, the following drawings are provided in which.

Figure 1:
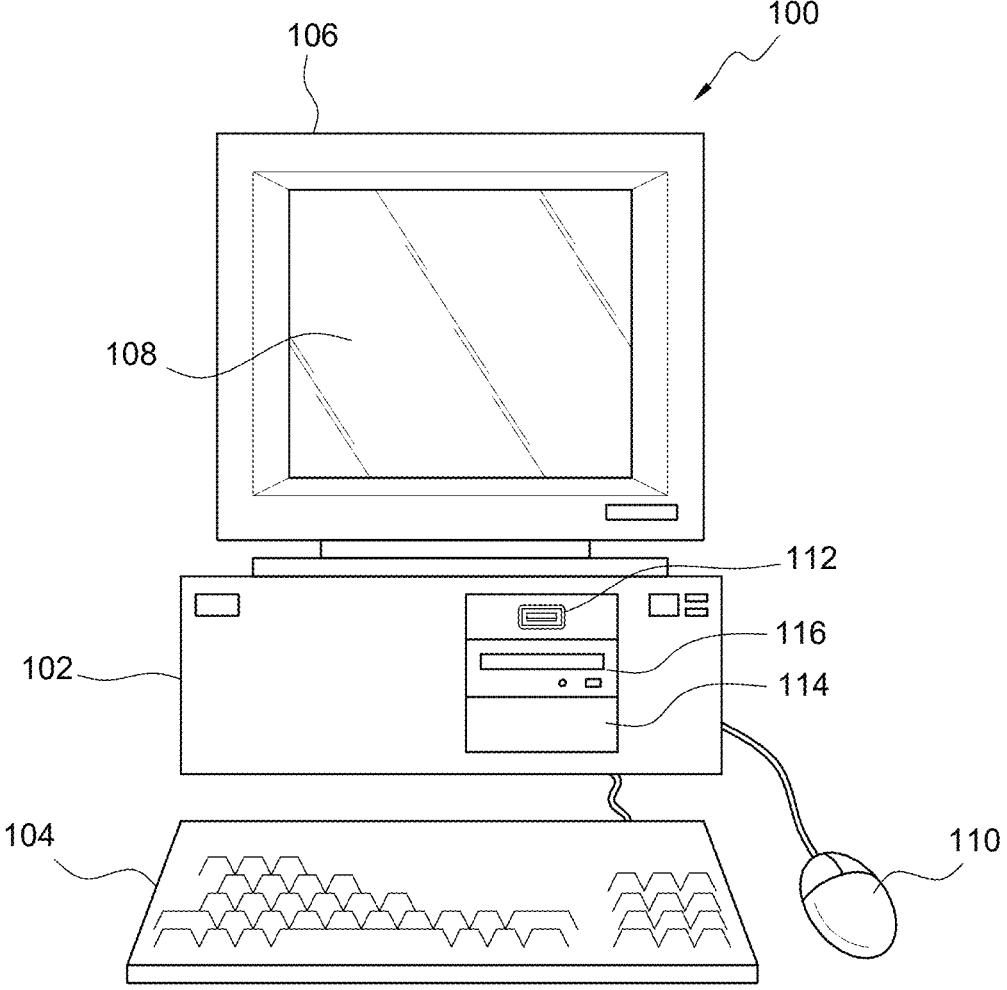
FIG. 1 illustrates a front elevational view of a computer system that is suitable for implementing an embodiment of the system disclosed in FIG. 3.

For simplicity and clarity of illustration, the drawing figures herein illustrate the general manner of construction, and descriptions and details of well-known features and techniques may be omitted to avoid unnecessarily obscuring the invention. Additionally, elements in the drawing figures are not necessarily drawn to scale. For example, the dimensions of some of the elements in the figures may be exaggerated relative to other elements to help improve understanding of embodiments of the present invention. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the invention described herein are, for example, capable of operation in other orientations than those illustrated or otherwise described herein.

The terms "couple," "coupled," "couples," "coupling," and the like should be broadly understood and refer to connecting two or more elements or signals, electrically, mechanically or otherwise. Two or more electrical elements may be electrically coupled, but not mechanically or otherwise coupled; two or more mechanical elements may be mechanically coupled, but not electrically or otherwise coupled; two or more electrical elements may be mechanically coupled, but not electrically or otherwise coupled. Coupling (whether mechanical, electrical, or otherwise) may be for any length of time, e.g., permanent or semi-permanent or only for an instant.

"Electrical coupling" and the like should be broadly understood and include coupling involving any electrical signal, whether a power signal, a data signal, and/or other types or combinations of electrical signals. "Mechanical coupling" and the like should be broadly understood and include mechanical coupling of all types. The absence of the word "removably," "removable," and the like near the word "coupled," and the like does not mean that the coupling, etc. in question is or is not removable.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real-time" encompasses operations that occur in "near" real-time or somewhat delayed from a triggering event. In a number of embodiments, "real-time" can mean real-time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately 1 second, 5 seconds, 10 seconds, 15 seconds, 20 seconds, 25 seconds, 30 seconds, 40 seconds, 50 seconds, 1 minute, or 2 minutes, 5 minutes, or 10 minutes.

DESCRIPTION OF EXAMPLES OF EMBODIMENTS

Artificial intelligence (AI) systems have become increasingly prevalent in various industries, including the legal sector. Such systems aim to enhance efficiency and productivity by automating complex tasks and providing rapid access to vast amounts of information. In the field of legal research and document analysis, AI-powered tools have shown promise in assisting legal professionals with tasks such as case law research, contract review, and document summarization. Despite the potential benefits, the application of AI in legal contexts presents unique challenges. Legal information is often nuanced, context-dependent, and subject to interpretation based on complex hierarchies of authority. There is a significant benefit to designing systems that can provide for accuracy and reliability of AI-generated responses, as errors or misinterpretations in legal matters can have significant consequences. Current AI systems used in legal applications often struggle with issues such as hallucinations, in which the system generates false or unsupported information. Additionally, these systems have difficulty distinguishing between different types of legal documents, understanding the hierarchy of legal authorities, or providing up-to-date information in a rapidly evolving legal landscape.

Retrieval-augmented generation (RAG) systems represent a significant advancement in AI technology, combining the power of large language models with information retrieval techniques. These systems aim to provide more accurate and contextually relevant responses by grounding their outputs in retrieved information from a knowledge base. In the legal domain, RAG systems have the potential to offer more reliable and substantiated answers to complex legal queries. However, current RAG systems for legal generative AI (gen AI) applications produce a significant number of hallucinations and inaccuracies, with hallucination rates ranging from 17% to 33% even in commercial legal research tools. These errors include misunderstanding case issues, failing to distinguish between legal actors (e.g., confusing parties in interest), misinterpreting the hierarchy of legal authority, and even fabricating nonexistent legal provisions. These issues pose technical problems that undermine the reliability and trustworthiness of AI-assisted legal research, creating substantial risks for legal professionals who rely on these systems.

These risks include potential ethical violations, such as breaching the duty of competence and supervision required by legal professional conduct rules. Lawyers may inadvertently present false information to courts, misadvise clients, or make strategic errors based on inaccurate AI-generated research. Moreover, verifying every AI-generated response and citation could negate the efficiency gains these tools promise.

Various embodiments described herein can address these challenges through techniques that continually train a generative AI RAG system so it can provide responses to questions that are relevant, accurate and defensible with sourced references. This approach provides a technical improvement by significantly reducing hallucinations and greatly increasing the utility of legal AI applications. By leveraging advanced approaches tailored to the nuances and complexities of legal information, various embodiments can enhance the reliability of AI-assisted legal research while maintaining high relevance and proper grounding of responses to legal queries in various different legal domains, such as the bankruptcy and corporate restructuring domain, among others. The techniques can prioritize properly cited sources, emphasize accuracy in information retrieval and presentation, adhere to a defined order of legal authority, and/or focus on recency of legal developments.

For example, in the bankruptcy context, many embodiments can leverage deep understanding of bankruptcy and corporate restructuring domains to create a proprietary methodology that generates high-quality responses to inquiries about bankruptcy rules, the bankruptcy process, and/or publicly filed bankruptcy cases. The approaches can apply to other legal domains, and in some cases, can apply to other non-legal knowledge domains. These techniques can offer users, such as legal professionals, a more reliable, predictable, and fact-driven tool for navigating the intricate landscape of legal information, significantly reducing the risks associated with current commercial legal AI systems.

Many embodiments can solve technical problems by providing technical solutions. For example, one of the technical problems with current RAG systems is fabrication of nonexistent legal provisions, in which AI systems generate text that claims the existence of legal provisions that do not actually exist. Various embodiments can provide a technical improvement to address this technical problem by providing a methodology that employs a two-stage retrieval and re-ranking process. The methodology can initially retrieve the top document chunks using semantic search and lexical search, after which it can then apply a cross-encoder model for detailed document-query matching. A quality threshold can filter out less relevant chunks. The final ranking can combine a base relevance score, a temporal relevance, and/or a document type importance, which can beneficially provide that responses are grounded in existing legal documents. In many embodiments, the response can include links to the sourced document chunks to demonstrate that the reaction is grounded in facts.

Another example of a technical problem is misinterpretation of legal authority hierarchy by current RAG systems, in which AI tools have difficulty grasping and applying the complex system of legal precedence and hierarchy that determines governing law. Various embodiments can provide a technical improvement to address this technical problem by incorporating an order of authority AI agent trained using in-context learning. The AI agent can apply a custom ranking algorithm that prioritizes documents by source and type. The process can group federal, local, and bankruptcy documents by source, then rank case-specific documents based on their authority determined by document type. This hierarchical approach aligns with the established order of legal authorities. An AI document classification model can be leveraged to identify the type of legal document.

An additional example of a technical problem is excessive agency in responses, in which current RAG systems often overstep their role by providing what amounts to legal advice, rather than just information retrieval and summarization. Various embodiments can provide a technical improvement to address this technical problem by using a chain-of-thought approach with defined reasoning steps. Such techniques can generate responses using inputs from these reasoning steps and cite relevant sources. The process can focus on information retrieval and summarization rather than generating new legal content, thus limiting the system's agency.

A further example of a technical problem is current RAG systems relying heavily on outdated information, as the corpus of information used by these systems is often dated, which can lead to inaccurate or outdated legal information being provided. Various embodiments can provide a technical improvement to address this technical problem by applying temporal relevance in its ranking algorithm. New court docket and document publications can be fetched from document repositories, such as the Public Access Court Electronic Records ("PACER"), and included in responses in near real-time. The methodology can decompose documents into chunks and apply weights based on their filing dates relative to the date range of the retrieved set. More recent chunks can receive higher weights, ranging from 1.0 to 0.0. The methodology can assign a default weight of 0.5 for chunks without a filing date. This approach prioritizes newer, potentially more-relevant information. The methodology can generates current and relevant responses because it incorporates the most recent court dockets and documents.

Yet another example of a technical problem is the persistence of hallucinations in current RAG systems. Despite claims of "hallucination-free," current commercial legal AI tools still produce a significant rate of hallucinations. Various embodiments can provide a technical improvement to address this technical problem by relying on retrieval rather than generation. This approach can use a cross-encoder model for accurate relevance scoring and can apply a minimum quality threshold to filter out potentially irrelevant chunks. The final selection process can consider a smaller subset of the top chunks based on combined scores, reducing the risk of including hallucinated information. Embodiments can use a natural language inference mode to detect hallucinations in the final response and can use guardrails to prevent the leakage of personal identifiable information (PII).

Yet still another example of a technical problem is the failure to distinguish between legal actors in current RAG systems. The systems struggle to differentiate between arguments made by litigants and statements by the court. Various embodiments can provide a technical improvement to address this technical problem by incorporating entity and keyword extraction from the query. The techniques can use a domain-specific reranking process that considers factors like jurisdiction and court authority. The document-type importance weighting in the final ranking can help differentiate between different legal actors based on the document's origin and purpose.

Various embodiments include a computer-implemented method. The method can include receiving a query from a user related to legal information. The method also can include performing an initial retrieval of document chunks from a corpus of legal documents. The method additionally can include applying a cross-encoder model to generate relevance scores for the document chunks. The method further can include filtering the document chunks based on a quality threshold. The method additionally can include calculating a combined score for each remaining document chunk of the document chunks based on a respective relevance score of the relevance scores, temporal relevance score, and a document type importance score. The method also can include selecting a subset of top-scoring document chunks based on the combined score. The method additionally can include generating a response to the query based on the subset of the top-scoring document chunks.

Additional embodiments include a system including one or more processors and one or more non-transitory computer-readable media storing computing instructions that, when executed on the one or more processors, cause the one or more processors to perform certain operations. The operations can include receiving a query from a user related to legal information. The operations also can include performing an initial retrieval of document chunks from a corpus of legal documents. The operations additionally can include applying a cross-encoder model to generate relevance scores for the document chunks. The operations further can include filtering the document chunks based on a quality threshold. The operations additionally can include calculating a combined score for each remaining document chunk of the document chunks based on a respective relevance score of the relevance scores, temporal relevance score, and a document type importance score. The operations also can include selecting a subset of top-scoring document chunks based on the combined score. The operations additionally can include generating a response to the query based on the subset of the top-scoring document chunks.

Further embodiments include one or more non-transitory computer-readable media storing computing instructions that, when executed on one or more processors, cause the one or more processors to perform certain operations. The operations can include receiving a query from a user related to legal information. The operations also can include performing an initial retrieval of document chunks from a corpus of legal documents. The operations additionally can include applying a cross-encoder model to generate relevance scores for the document chunks. The operations further can include filtering the document chunks based on a quality threshold. The operations additionally can include calculating a combined score for each remaining document chunk of the document chunks based on a respective relevance score of the relevance scores, temporal relevance score, and a document type importance score. The operations also can include selecting a subset of top-scoring document chunks based on the combined score. The operations additionally can include generating a response to the query based on the subset of the top-scoring document chunks.

Figure 2:
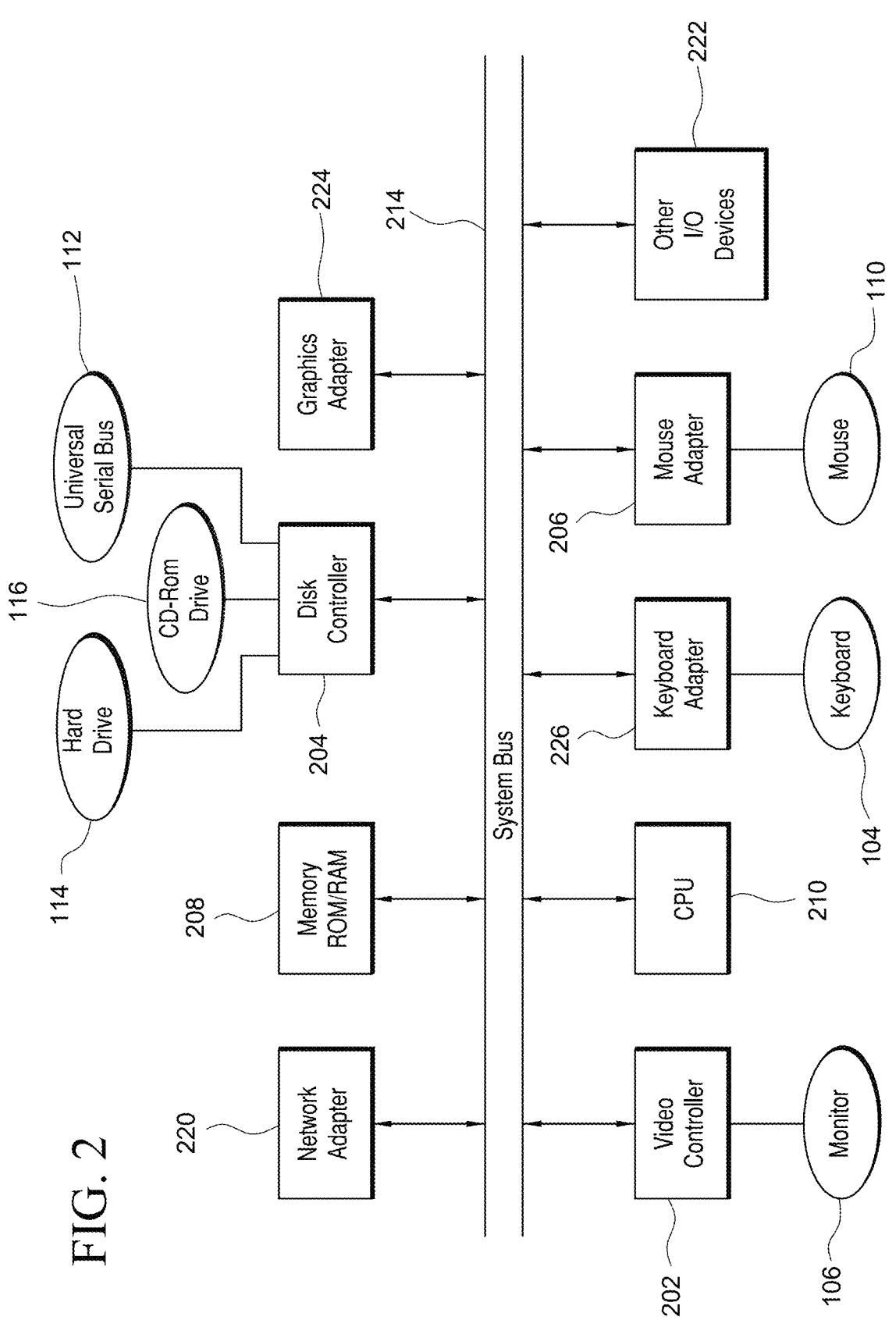
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the non-transitory computer readable media described herein. As an example, a different or separate one of computer system 100 (and its internal components, or one or more elements of computer system 100) can be suitable for implementing part or all of the techniques described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to memory storage unit 208 that includes both read only memory (ROM) and random access memory (RAM). Non-volatile portions of memory storage unit 208 or the ROM can be encoded with a boot code sequence suitable for restoring computer system 100 (FIG. 1) to a functional state after a system reset. In addition, memory storage unit 208 can include microcode such as a Basic Input-Output System (BIOS). In some examples, the one or more memory storage units of the various embodiments disclosed herein can include memory storage unit 208, a USB-equipped electronic device (e.g., an external memory storage unit (not shown) coupled to universal serial bus (USB) port 112 (FIGS. 1-2)), hard drive 114 (FIGS. 1-2), and/or CD-ROM, DVD, Blu-Ray, or other suitable media, such as media configured to be used in CD-ROM and/or DVD drive 116 (FIGS. 1-2). Non-volatile or non-transitory memory storage unit(s) refer to the portions of the memory storage units(s) that are non-volatile memory and not a transitory signal. In the same or different examples, the one or more memory storage units of the various embodiments disclosed herein can include an operating system, which can be a software program that manages the hardware and software resources of a computer and/or a computer network. The operating system can perform basic tasks such as, for example, controlling and allocating memory, prioritizing the processing of instructions, controlling input and output devices, facilitating networking, and managing files. Exemplary operating systems can include one or more of the following: (i) Microsoft® Windows® operating system (OS) by Microsoft Corp. of Redmond, Washington, United States of America, (ii) Mac® OS X by Apple Inc. of Cupertino, California, United States of America, (iii) UNIX® OS, and (iv) Linux® OS. Further exemplary operating systems can comprise one of the following: (i) the iOS® operating system by Apple Inc. of Cupertino, California, United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, California, United States of America, (v) the Windows Mobile™ operating system by Microsoft Corp. of Redmond, Washington, United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processors of the various embodiments disclosed herein can comprise CPU 210.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to a keyboard 104 (FIGS. 1-2) and a mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for refreshing a monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM and/or DVD drive 116 (FIGS. 1-2). In other embodiments, distinct units can be used to control each of these devices separately.

In some embodiments, network adapter 220 can comprise and/or be implemented as a WNIC (wireless network interface controller) card (not shown) plugged or coupled to an expansion port (not shown) in computer system 100 (FIG. 1). In other embodiments, the WNIC card can be a wireless network card built into computer system 100 (FIG. 1). A wireless network adapter can be built into computer system 100 (FIG. 1) by having wireless communication capabilities integrated into the motherboard chipset (not shown), or implemented via one or more dedicated wireless communication chips (not shown), connected through a PCI (peripheral component interconnector) or a PCI express bus of computer system 100 (FIG. 1) or USB port 112 (FIGS. 1-2). In other embodiments, network adapter 220 can comprise and/or be implemented as a wired network interface controller card (not shown).

Although many other components of computer system 100 (FIG. 1) are not shown, such components and their interconnection are well known to those of ordinary skill in the art. Accordingly, further details concerning the construction and composition of computer system 100 (FIG. 1) and the circuit boards inside chassis 102 (FIG. 1) are not discussed herein.

When computer system 100 in FIG. 1 is running, program instructions stored on a USB drive in USB port 112, on a CD-ROM or DVD in CD-ROM and/or DVD drive 116, on hard drive 114, or in memory storage unit 208 (FIG. 2) are executed by CPU 210 (FIG. 2). A portion of the program instructions, stored on these devices, can be suitable for carrying out all or at least part of the techniques described herein. In various embodiments, computer system 100 can be reprogrammed with one or more modules, system, applications, and/or databases, such as those described herein, to convert a general purpose computer to a special purpose computer. For purposes of illustration, programs and other executable program components are shown herein as discrete systems, although it is understood that such programs and components may reside at various times in different storage components of computing system 100, and can be executed by CPU 210. Alternatively, or in addition to, the systems and procedures described herein can be implemented in hardware, or a combination of hardware, software, and/or firmware. For example, one or more application specific integrated circuits (ASICs) or Field Programmable Gate Arrays (FPGAs) can be programmed to carry out one or more of the systems and procedures described herein. For example, one or more of the programs and/or executable program components described herein can be implemented in one or more ASICs or FPGAs.

Although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile device, such as a smartphone. In certain additional embodiments, computer system 100 may comprise an embedded system.

Figure 3:
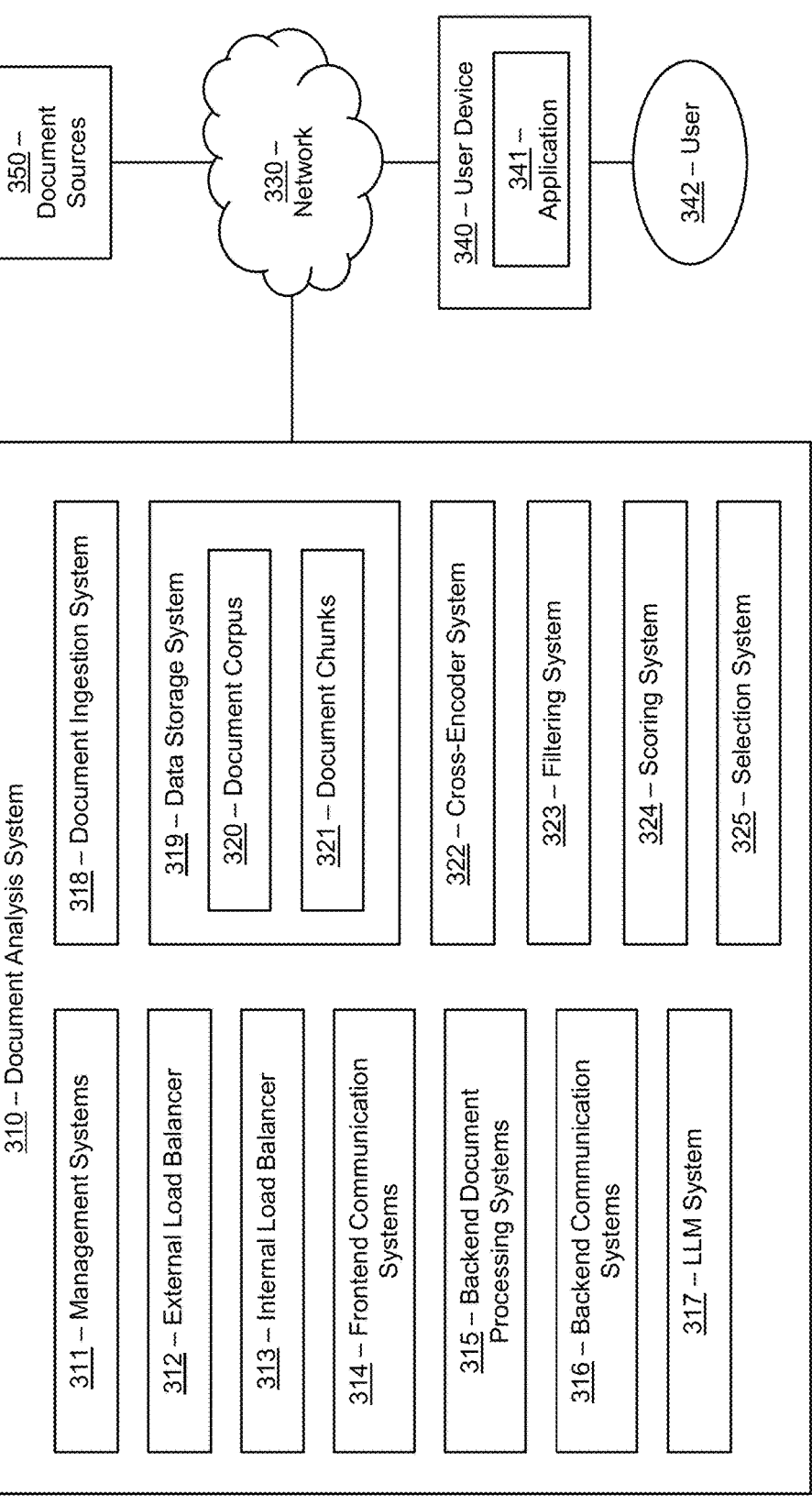
FIG. 3 illustrates a block diagram of a system that can be employed for fine-tuning classification and domain-specific taxonomical hierarchy in RAG pipelines for processing and analyzing documents, according to an embodiment.

Turning ahead in the drawings, FIG. 3 illustrates a block diagram of a system 300 for fine-tuning classification and domain-specific taxonomical hierarchy in RAG pipelines for processing and analyzing documents, according to an embodiment. System 300 is merely exemplary, and embodiments of the system are not limited to the embodiments presented herein. The system can be employed in many different embodiments or examples not specifically depicted or described herein. In some embodiments, certain elements, modules, or systems of system 300 can perform various procedures, processes, and/or activities. In other embodiments, the procedures, processes, and/or activities can be performed by other suitable elements, modules, or engines of system 300. Generally, therefore, system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

In some embodiments, system 300 can include a document analysis system 310, a network 330, one or more user devices 340 operated by one or more users 342, and one or more document sources 350. Document analysis system 310 and/or user device 340 can each be a computer system, such as computer system 100 (FIG. 1), as described above, and can each be a single computer, a single server, or a cluster or collection of computers or servers, or a cloud of computers or servers. In another embodiment, a single computer system can host document analysis system 310 and/or user device 340.

In some embodiments, document analysis system 310 can be in data communication through network 330 with one or more user devices, user device 340. User device 340 can be part of system 300 or external to system 300. Network 330 can be the Internet or another suitable network. In some embodiments, user device 340 can be used by users, such as a user 342. In many embodiments, document analysis system 310 can host one or more websites and/or mobile application servers. For example, document analysis system 310 can host a website or provide a server that interfaces with an application 341 (e.g., a mobile application or a web application), on user device 340, which can allow users (e.g., 342) to interface with document analysis system 310, such as to process and analyze documents.

In some embodiments, an internal network that is not open to the public can be used for communications between components within document analysis system 310. Accordingly, in some embodiments, some of the components of document analysis system 310 can refer to a back end of document analysis system 310, which can be operated by an operator and/or administrator of document analysis system 310, while other components of document analysis system 310 can refer to a front end of system 300, as it can be accessed and/or used by one or more users, such as user 342, using user device 340. In these or other embodiments, the operator and/or administrator of system 300 can manage system 300, the processors of system 300, and/or the storage units of system 300 using the input devices and/or display devices of system 300.

In certain embodiments, the user devices (e.g., user device 340) can be desktop computers, laptop computers, mobile devices, and/or other endpoint devices used by one or more users (e.g., user 342). A mobile device can refer to a portable electronic device (e.g., an electronic device easily conveyable by hand by a person of average size) with the capability to present audio and/or visual data (e.g., text, images, videos, music, etc.). For example, a mobile device can include at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile device can include a volume and/or weight sufficiently small as to permit the mobile device to be easily conveyable by hand.

In a number of embodiments, document analysis and processing can be performed by system 300, document analysis system 310, and/or user device 340. Document analysis can refer to retrieving, processing, and analyzing documents to generate responses to user queries. In many embodiments, document analysis system 310 can include management systems 311, an external load balancer 312, an internal load balancer 313, frontend communication systems 314, backend document processing systems 315, backend communication systems 316, a large language model (LLM) system 317, a document ingestion system 318, a data storage system 319, a cross-encoder system 322, a filtering system 323, a scoring system 324, and/or a selection system 325. Data storage system can store various data, such as a document corpus 320 and document chunks 321. In many embodiments, various systems of document analysis system 310 can be modules of computing instructions (e.g., software modules) stored at non-transitory computer readable media that operate on one or more processors. In some embodiments, various systems of document analysis system 310 can be implemented in hardware.

In many embodiments, document analysis system 310 can include one or more input devices (e.g., one or more keyboards, one or more keypads, one or more pointing devices such as a computer mouse or computer mice, one or more touchscreen displays, a microphone, etc.), and/or can comprise one or more display devices (e.g., one or more monitors, one or more touch screen displays, projectors, etc.). In these or other embodiments, one or more of the input devices can be similar or identical to keyboard 104 (FIG. 1) and/or a mouse 110 (FIG. 1). Further, one or more of the display devices can be similar or identical to monitor 106 (FIG. 1) and/or screen 108 (FIG. 1). The input devices and the display devices can be coupled to document analysis system 310 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input devices and the display devices to the processors and/or the storage units. In some embodiments, the KVM switch also can be part of document analysis system 310. In a similar manner, the processors and/or the non-transitory computer-readable media can be local and/or remote to each other.

Meanwhile, in many embodiments, document analysis system 310 also can be configured to communicate with one or more databases. The one or more databases (e.g., data storage system 319) that contains information retrieved from external services and/or generated internally. The one or more databases can be stored on one or more memory storage units (e.g., non-transitory computer readable media), which can be similar or identical to the one or more memory storage units (e.g., non-transitory computer readable media) described above with respect to computer system 100 (FIG. 1). Also, in some embodiments, for any particular database of the one or more databases, that particular database can be stored on a single memory storage unit, or the contents of that particular database can be spread across multiple ones of the memory storage units storing the one or more databases, depending on the size of the particular database and/or the storage capacity of the memory storage units. The one or more databases can each include a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, and IBM DB2 Database.

Meanwhile, document analysis system 310 and/or the one or more databases can be implemented using any suitable manner of wired and/or wireless communication. Accordingly, document analysis system 310 can include any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can include Bluetooth, Zigbee, Wireless Universal Serial Bus (USB), Z-Wave, etc.; exemplary LAN and/or WAN protocol(s) can include Institute of Electrical and Electronic Engineers (IEEE) 802.3 (also known as Ethernet), IEEE 802.11 (also known as WiFi), etc.; and exemplary wireless cellular network protocol(s) can include Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can include wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can include wireless communication hardware including, for example, one or more radio transceivers, one or more infrared transceivers, etc. Additional exemplary communication hardware can include one or more networking components (e.g., modulator-demodulator components, gateway components, etc.).

Management systems 311 can oversee and coordinate the operations of document analysis system 310. These systems can handle resource allocation, system monitoring, and performance optimization across various components. For example, management system 311 can be a management layer that can include several components that work together to provide secure, efficient, and/or well-monitored operation of document analysis system 310. For example, identity and access management can control access to various system resources, preventing unauthorized users or processes from interacting with specific components, and can manage user identities, roles, and permissions across the system. Secrets management can securely store and manage sensitive information such as API keys, database credentials, and other confidential data, which can provide controlled access. User authentication and authorization can handle user authentication and authorization for external access to the system, such as managing user sign-up, sign-in, and access token generation, to provide secure user interactions with the frontend systems. Monitoring can track system performance, resource utilization, and/or application health, such as by collecting and analyzing metrics from various parts of the system, to provide insights into operational status and helping identify potential issues. Logging can centralize and manage system logs from different components, which can facilitate troubleshooting, auditing, and analysis of system behavior by aggregating log data from across the infrastructure. Queue management can handle task scheduling and distribution within the system, such as managing job queues for various processing tasks, to provide efficient allocation of work across available resources and helping to maintain system responsiveness under varying loads.

External load balancer 312 can distribute incoming network traffic from sources external to document analysis system 310, such as user queries, across multiple frontend servers, such as frontend communications systems 314, to provide efficient handling of requests and/or optimal system performance. Internal load balancer 313 can manage the distribution of processing tasks within the internal components of document analysis systems 310, allocating workloads across various backend systems, such as backend document processing systems, to optimize resource utilization.

Frontend communication systems 314 can handle user interactions, receiving queries from users and transmitting responses back to them. Frontend communication systems 314 can include various instances of a web servers or APIs for facilitating communication between the system and external user devices, such as user device 340. Backend document processing systems 315 can perform core document analysis tasks, including document retrieval, content analysis, and response generation based on processed information. In some cases, backend document processing systems 315 can incorporate an order of authority AI agent, which can be trained using in-context learning to apply a custom ranking algorithm. This algorithm can prioritize documents by source and type, helping to establish a hierarchy of legal authorities within the processed documents. In some cases, backend document processing systems 315 can utilize an AI document classification model, which can identify the type of legal document being processed. By accurately classifying document types, backend document processing systems 315 can enhance the system's ability to organize and prioritize information based on its legal significance. Backend document processing systems 315 can use prompt engineering software and methodology. This methodology can use a chain-of-thought approach with defined reasoning steps. By breaking down complex legal queries into a series of logical steps, backend document processing systems 315 can facilitate generating more accurate and relevant responses.

Backend communication systems 316 can facilitate the exchange of data and instructions between various internal components, such as backend document processing systems 315 and LLM system 317, and/or can manage the flow of document chunks and metadata between storage and processing components. In some embodiments, frontend communication systems 314, backend document processing systems 315, and/or backend communication systems 316 can each be an Amazon Web Services (AWS) Elastic Container Service (ECS) instance, which can be a containerized application instance that runs on a cluster of virtual machines or servers.

LLM system 317 can host an LLM for generating responses based on the query and selected document chunks using a fine-tuned RAG framework. For example, Amazon Bedrock can host an LLM, such a Claude Sonnet, or another suitable LLM, to generate human-like responses to queries based on analyzed document content. LLM system 317 can provide advanced language processing capabilities to support the document analysis and query response functions of the system 300. In some cases, the LLM system 317 can work in conjunction with backend document processing systems 315 to interpret complex legal language, generate coherent responses, and ensure the accuracy of the information provided to users.

Document ingestion system 318 can handle the intake of new documents, processing them for storage and analysis within the system. Document ingestion system 318 can fetch new court docket and document publications from document sources 350, such as the Public Access Court Electronic Records (PACER) system and/or other suitable document sources. In some cases, document ingestion system 318 can retrieve and process these documents to be included in responses in real-time. Data storage system 319 can store the ingested documents in document corpus 320. In some cases, document corpus 320 can be organized into document chunks 321. Document corpus 320 can be maintained within data storage system 319. In some cases, document corpus 320 can contain legal documents, court filings, case law, statutes, regulations, and other relevant legal materials. The document corpus 320 can be regularly updated with new documents retrieved from external sources through the network 330. Document chunks may be portions of documents divided based on logical groupings, such as local rules, orders, or filings, etc. Document ingestion system 318 can process newly ingested documents to prepare them for storage and retrieval. This processing can involve extracting metadata, such as filing dates and document types. In some cases, the document ingestion system can classify new documents based on their type. After processing, document ingestion system 318 can divide the new documents into document chunks 321. Document chunks 321 can then be stored in data storage system 319 as part of document corpus 320. By storing documents as chunks, document analysis system 310 can enable more efficient retrieval and analysis of relevant information. In some cases, document ingestion system 318 can implement scheduled synchronization processes to keep the document corpus 320 up-to-date with external sources, and/or cab periodically check for updates, new filings, or changes in existing documents and incorporate these updates into the document corpus 320. The real-time inclusion of newly fetched documents in responses can allow the system to provide up-to-date information. This capability can be particularly valuable in the rapidly changing landscape of legal domains, such as bankruptcy and corporate restructuring, in which new filings and court decisions can have significant impacts.

Cross-encoder system 322 can perform document-query matching, generating relevance scores to determine the most pertinent document chunks for a given query. For example, cross-encoder system 322 can utilize cosine similarity to compare the embeddings of the query with the embeddings of the document chunks, producing normalized output scores ranging from 0 to 1.

Filtering system 323 can refine the set of document chunks based on quality thresholds, providing that the most relevant and reliable information is used for response generation. For example, filtering system 323 can apply a quality threshold to the relevance scores generated by the cross-encoder system. In some cases, filtering system 323 can use a minimum quality threshold to filter out potentially irrelevant or marginally relevant document chunks. Filtering can beneficially provide that chunks with meaningful relevance to the query are considered for further processing, while those with less relevance are filtered out.

Scoring system 324 can calculate combined scores for document chunks, considering factors such as relevance, temporal importance, and document type to rank their significance. In some cases, the relevance score may be weighted more heavily than the other factors in the combined score calculation.

Selection system 325 can choose the most appropriate subset of top-scoring document chunks to be used in generating the final response to a user query. Selection system 325 can chooses a subset of top-scoring document chunks based on the combined scores calculated by the scoring system. This subset of document chunks can be used to generate a response to the original query.

Collectively, these systems of document analysis system 310 can provide a document processing pipeline that incorporates several interconnected systems to analyze and process documents efficiently to provide a fine-tuning improvement to conventional RAG pipelines. To enhance the accuracy and reliability of the generated responses, document analysis system 310 can use a natural language inference mode to detect potential hallucinations in the final response. This process can help to identify and mitigate instances where the generated content may deviate from the factual information present in the source documents. In addition to accuracy measures, document analysis system 310 can implement guardrails to prevent the leakage of personal identifiable information (PII). These guardrails can involve filtering mechanisms or data masking techniques to prevent sensitive personal information from being inadvertently included in the generated responses. By combining these various systems and safeguards, the document processing pipeline can provide accurate, relevant, and secure responses to user queries while minimizing the risk of hallucinations or data privacy breaches.

Figure 4:
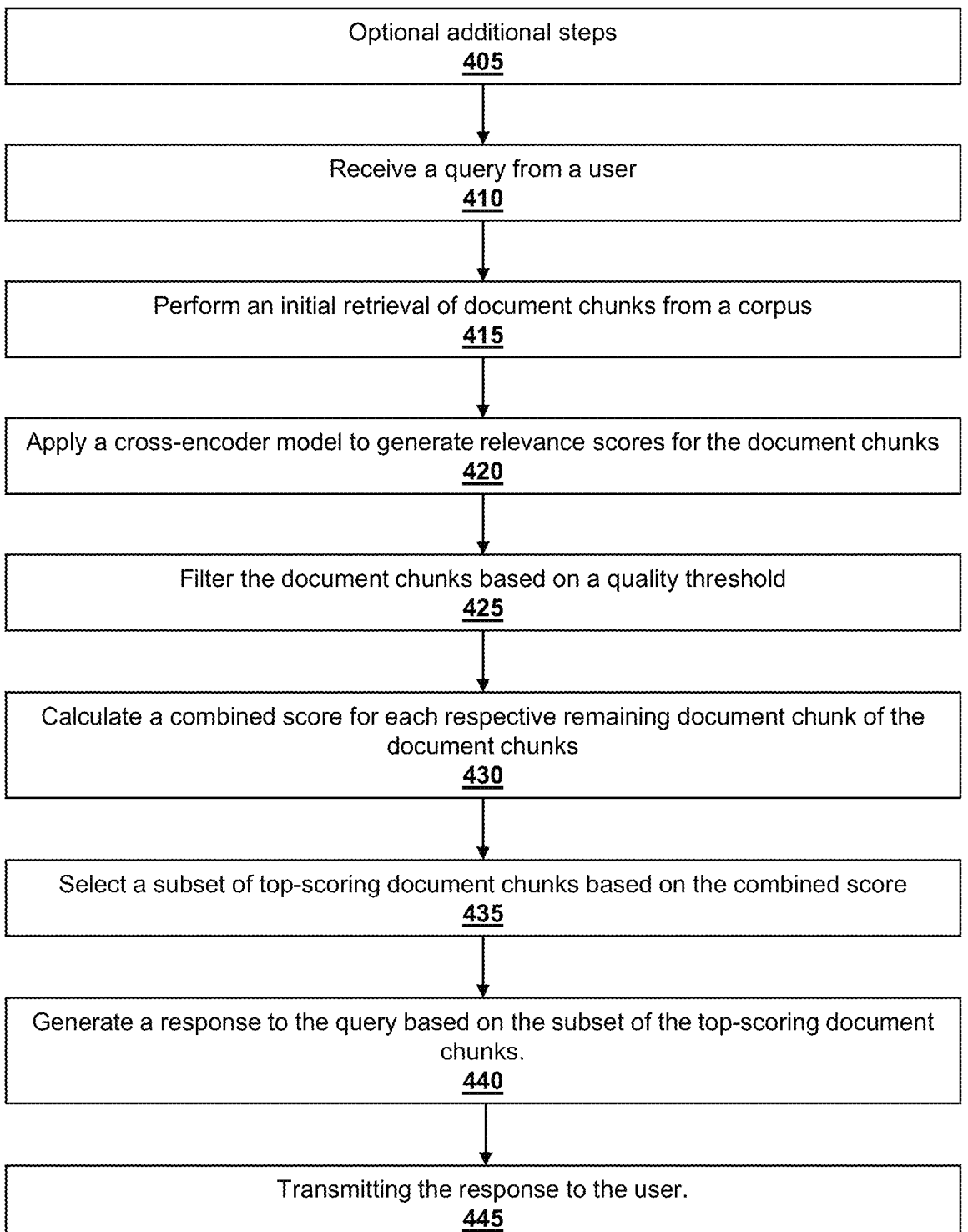
FIG. 4 illustrates a flowchart for a method of fine-tuning classification and domain-specific taxonomical hierarchy in RAG pipelines for processing and analyzing documents, according to an embodiment.

Turning ahead in the drawings, FIG. 4 illustrates a flowchart of a method 400 for fine-tuning classification and domain-specific taxonomical hierarchy in RAG pipelines for processing and analyzing documents, according to an embodiment. Method 400 is merely exemplary and is not limited to the embodiments presented herein. Method 400 can be employed in many different embodiments or examples not specifically depicted or described herein. In some embodiments, the procedures, the processes, and/or the activities of method 400 can be performed in the order presented. In other embodiments, the procedures, the processes, and/or the activities of method 400 can be performed in any suitable order. In still other embodiments, one or more of the procedures, the processes, and/or the activities of method 400 can be combined or skipped. In many embodiments, system 300 (FIG. 3), document analysis system 310 (FIG. 3), and/or various components thereof can be suitable to perform method 400 and/or one or more of the activities of method 400. In these or other embodiments, one or more of the activities of method 400 can be implemented as one or more computing instructions configured to run at one or more processors and configured to be stored at one or more non-transitory computer readable media. Such non-transitory computer readable media can be part of system 300 (FIG. 3) and/or document analysis system 310 (FIG. 3). The processor(s) can be similar or identical to the processor(s) described above with respect to computer system 100 (FIG. 1).

Referring to FIG. 4, method 400 can include an activity 405 of performing optional additional steps, as described below. In a number of embodiments, activity 405 can involve preprocessing or preparation tasks that may be performed before the main query processing begins. In many embodiments, these optional additional steps can include data ingestion, document classification, or other preparatory activities. In some embodiments, activity 405 can be performed periodically, continually, and/or as new documents become available.

In several embodiments, method 400 can include an activity 410 of receiving a query from a user. In several embodiments, activity 410 can include receiving a query through one of frontend communication systems 314 (FIG. 3) of document analysis system 310 (FIG. 3). In many embodiments, the query can be entered by a user (e.g., 342) in an application (e.g., application 341 (FIG. 3)) on a user device (e.g., user device 340). For example, a query can be a legal query from a legal professional seeking information on a specific legal issue related to a particular legal case. Examples of queries and responses are described below in further detail.

In a number of embodiments, the query can be rephrased by document analysis system 310 (FIG. 3) to capture context of the query, to remove jargon, and/or normalize the query. For example, document analysis system 310 (FIG. 3) can employ natural language processing techniques to rephrase the received query, enhancing its clarity and effectiveness for document retrieval. This rephrasing process can involve identifying and expanding on the contextual elements of the query, potentially incorporating relevant legal or domain-specific knowledge to better capture the user's intent. Additionally, document analysis system 310 (FIG. 3) can remove or replace jargon or colloquial terms with more standardized language, and/or can normalize the query structure to improve consistency and compatibility with the document retrieval algorithms.

In some embodiments, document analysis system 310 (FIG. 3) can use natural language processing techniques and/or LLMs to identify and extract key entities and keywords from the received query. For example, document analysis system 310 (FIG. 3) can utilize named entity recognition algorithms to identify specific legal concepts, case names, statutes, or other domain-specific entities mentioned in the query. Additionally, document analysis system 310 (FIG. 3) can apply tokenization and part-of-speech tagging to break down the query into individual words and identify their grammatical roles, helping to isolate important nouns, verbs, and adjectives. document analysis system 310 (FIG. 3) also can use frequency analysis and term weighting techniques, such as TF-IDF (Term Frequency-Inverse Document Frequency), to determine which words or phrases are most significant within the context of the query and the legal domain. Furthermore, document analysis system 310 can leverage a domain-specific ontology or knowledge base to recognize and extract legal terminology and concepts that may not be explicitly stated but are implied by the query's context.

In several embodiments, method 400 also can include an activity 415 of performing an initial retrieval of document chunks from a corpus. In several embodiments, activity 415 can include searching the document corpus (e.g., 320 (FIG. 3) and/or the document chunks (e.g., 321 (FIG. 3)) for potentially relevant document chunks based on the received query. This initial retrieval process can utilize various information retrieval techniques, such as keyword matching, semantic similarity, contextual relevance, or vector space models, to identify document chunks that are potentially relevant to the user's query. For example, in some embodiments, BM25 (Best Match 25) can be used. As described above, the document corpus can be organized into smaller, manageable units called document chunks, which can represent logical sections or paragraphs of the documents. These chunks can be preprocessed and indexed to facilitate efficient searching and retrieval. The initial retrieval process can consider factors and document structure to rank the potential relevance of each chunk to the query. In some embodiments, the chunks can be ranked (e.g., based on relevance using the conventional retrieval techniques), and a set of the top chunks can be provided to the next activity. For example, the number of chunks can be 50, 100, 110, 120, 130, 140, 150, 200, or another suitable number of chunks.

In several embodiments, method 400 additionally can include an activity 420 of applying a cross-encoder model to generate relevance scores for the document chunks. In several embodiments, activity 420 can include using a cross-encoder model to analyze the retrieved document chunks and generate relevance scores indicating how well each chunk matches the query.

The cross-encoder model can be a suitable cross-encoder, such as a neural network that compares pairs of text sequences, in this case, the query and each document chunk. Unlike simpler matching techniques, the cross-encoder model can capture complex semantic relationships between the query and the document chunks, considering context and nuanced meanings. This cross-encoder model can process the query and each document chunk together, allowing for direct comparison and interaction between their representations at multiple levels of abstraction. The cross-encoder model can generate a single relevance score for each query-chunk pair, which can be normalized between 0 and 1, in which higher scores indicate greater relevance. This scoring process can involve multiple internal layers of the neural network, each capturing different aspects of the relationship between the query and the document chunk. In some embodiments, the cross-encoder model can be pre-trained on large corpus and fine-tuned for the specific task of relevance scoring in the context of document retrieval in a particular domain, such as legal documents, or even more specific, such as bankruptcy documents. This specialized training can help the model understand domain-specific language and concepts, improving its accuracy in assessing relevance for legal queries.

In many embodiments, the cross-encoder model can use cosine similarity as a component in assessing the relevance between the query and document chunks. In this approach, the cross-encoder model can first transform both the query and each document chunk into high-dimensional vector representations, capturing semantic and contextual information. The cosine similarity between these vectors is then calculated, providing a measure of their directional similarity in the vector space, with values closer to 1 indicating higher relevance and values closer to 0 indicating lower relevance. The output of activity 420 can be a set of relevance scores that provide a more refined and context-aware ranking of the document chunks compared to the initial retrieval. These relevance scores can then be used in the next activity. In many embodiments, activity 420 can be performed at least in part by cross-encoder system 322 (FIG. 3).

In a number of embodiments, method 400 further can include an activity 425 of filtering the document chunks based on a quality threshold. In several embodiments, activity 425 can involve removing document chunks with relevance scores below a certain threshold to provide that sufficiently relevant information is used in generating a response to the query. The quality threshold can be a fixed predetermined threshold, such as 0.3, 0.35, 0.4, 0.45, 0.5, 0.55, 0.60, 0.65, or another suitable threshold. In other embodiments, the quality threshold can be dynamically adjusted based on factors such as the query complexity, the number of retrieved chunks, or the distribution of relevance scores. Filtering can significantly reduce the number of document chunks that are processed in later stages, which can improve the system's efficiency and response time, while also providing more relevant responses. The threshold can be carefully chosen to avoid excluding potentially valuable information while still maintaining a high standard of relevance. The filtered set of document chunks can provide a more focused and pertinent collection of information for further processing. This refined set can help provide that the final response generated by the system is based on the most relevant and high-quality information available in the document corpus. In many embodiments, activity 425 can be performed at least in part by filtering system 323 (FIG. 3).

In several embodiments, method 400 additionally can include an activity 430 of calculating a combined score for each respective remaining document chunk. In several embodiments, activity 430 can include considering factors such as the relevance score, temporal relevance, and document type importance to generate a comprehensive score for each chunk. This combined scoring approach can provide a more nuanced and context-aware ranking of the document chunks.

The relevance score from the cross-encoder model can serve as a component of the combined score, reflecting the semantic similarity between the query and the document chunk. In some embodiments, this score can be weighted more heavily than other factors to provide that content relevance remains a primary consideration.

Temporal relevance also can be incorporated to account for the recency of the information contained in each document chunk. In legal contexts, more recent documents or rulings often carry greater weight or relevance. The system can calculate a temporal score based on the document's creation or last update date, in which newer documents get higher weight. In some embodiments, a decay function can be used to gradually reduce the score for older documents.

Document type importance also can be factored in based on a hierarchy of authorities for types of documents. For example, the order of authorities in bankruptcy proceedings establishes a hierarchy of legal documents and actions, with opinions and orders issued by bankruptcy judges carrying the highest authority. Plans and disclosure statements follow, outlining the debtor's proposed restructuring and providing crucial financial information to creditors. Stipulations, motions, and applications represent formal requests and agreements within the bankruptcy process, while memoranda of law, affidavits, and reports provide supporting arguments and factual information. The hierarchy continues with procedural documents such as petitions, transcripts, and complaints, followed by various notices, exhibits, and responses that facilitate communication and present evidence throughout the bankruptcy case. In many embodiments, the system can utilize a predefined ranking of document types or an adaptive scoring mechanism based on the query context.

In a number of embodiments, each document from which a document chunk is derived can be classified as a particular document type using a machine-learning classification model. This classification model can be trained on a corpus of legal documents, learning to recognize distinctive features and patterns associated with different document types such as opinions, orders, motions, or affidavits. The model can analyze various aspects of the document, including its structure, language patterns, formatting, and content, to determine its most likely classification within the legal document hierarchy. By accurately classifying documents, the system can assign appropriate importance scores based on the document type, enhancing the relevance calculation process for document chunks. This automated classification process can also help in organizing and structuring the document corpus, facilitating more efficient retrieval and analysis of legal information. Examples of machine learning models for this classification task can include support vector machines (SVMs), random forests, convolutional neural networks (CNNs), transformer-based models like BERT (Bidirectional encoder representations from transformers), and/or other suitable classification models.

In some implementations, the combined score can be calculated using a weighted sum or more complex mathematical functions that balance these different factors. The weights for each factor can be fine-tuned based on historical performance data or expert input to optimize the system's ability to identify the most relevant and authoritative information. The resulting combined score can provide a holistic measure of each document chunk's relevance and importance, considering not just its content but also its recency and authority. This comprehensive scoring can help ensure that the most valuable and appropriate information is prioritized in subsequent processing steps. In many embodiments, activity 430 can be performed at least in part by scoring system 324 (FIG. 3).

An non-limiting example of a formula for calculating the combined score (combined_score) is as follows:

$$\begin{aligned} \text{combined\_score} = & (\text{cross\_encoder\_weight} * \text{cross\_encoder\_score}) + \\ & (\text{date\_weight} * \text{date\_score}) + \\ & (\text{type\_weight} * \text{type\_score}) \end{aligned}$$

Three scores play a role in this formula:

cross_encoder_score is the cross encoder score, which ranges between −1 to +1, as calculated by the cross-encoder model.

date_score is the temporal relevance score, which ranges 0 to 1.

type_score is the document type importance score, based on the document type ranges between 0 to 1.

Three weights are used to provide a weighting for each component score:

cross_encoder_weight is the cross-encoder weight, which is used to weight cross_encoder_score. In some cases, cross_encoder_weight can be more than each of date_weight or type_weight, and in some cases, can be more than the combination of date_weight and type_weight. For example, the cross-encoder weight can be 60% or another suitable weight.

date_weight is the temporal weight, which is used to weight date_score. In some the temporal weight can be 20% or another suitable weight.

type_weight is the document type weight, which is used to weight type_score. In some the document type weight can be 20% or another suitable weight.

In a number of embodiments, method 400 further can include an activity 435 of selecting a subset of top-scoring document chunks based on the combined score. In several embodiments, activity 435 can involve choosing the highest-scoring document chunks to be used in generating the response. This selection process can determine the most relevant and authoritative information to be used in formulating the final response to the user's query. The system can use various strategies to select the top-scoring chunks. In some implementations, a fixed number of top-scoring chunks may be selected, such as the top 10, 15, 20, 25, or 30. Alternatively, the system can use a fixed threshold, selecting chunks with combined scores above that threshold. Other embodiments can use a dynamic threshold, such as selecting chunks with combined scores above a certain percentile or standard deviation from the mean. In many embodiments, activity 435 can be performed at least in part by selection system 325 (FIG. 3).

In several embodiments, method 400 additionally can include an activity 440 of generating a response to the query based on the subset of the top-scoring document chunks. In several embodiments, activity 440 can include using the selected document chunks to formulate a comprehensive and accurate response to the user's original query. This response generation process can involve natural language processing and generation techniques to synthesize information from multiple document chunks into a coherent and relevant answer. In many embodiments, the system can employ an LLM (e.g., LLM system 317) or other advanced text generation models to create the response. In many embodiments, activity 440 can include inputting the query, augmented with the subset of the top-scoring document chunks, into the LLM to generate the response to the query.

In generating the response, the system can prioritize information from higher-scoring chunks. The response generation process can involve techniques such as abstractive summarization, in which information is extracted and reformulated, rather than simply concatenating text from the selected chunks. The system can incorporate mechanisms to maintain traceability between the generated response and the source document chunks. This approach can involve including citations or references to specific documents, which can enable the user to verify the sources of the information provided in the response. To enhance the quality of the generated response, the system can implement fact-checking mechanisms. These approaches can compare information across multiple chunks to corroborate facts and identify any potential inconsistencies or contradictions before including them in the final response. In some cases, the response generation process can consider the user's level of expertise, adjusting the complexity and detail of the response accordingly. For instance, responses to queries from legal professionals can include more technical details and citations, while responses to layperson queries can provide more explanatory context.

In many embodiments, activity 440 can focus the LLM on information retrieval and summarization rather than generating new legal content, which can limit the LLMs agency by primarily extracting and condensing relevant information from the selected top-scoring document chunks. The system can present existing legal information in a concise and relevant manner without creating or inferring new legal content. This approach relies on the authoritative sources within the document corpus, to provide that the response is grounded in established legal documents and precedents. Limiting the LLMs role to retrieval and summarization mitigates the risk of generating inaccurate or unsupported legal interpretations, which can maintain the integrity and reliability of the information provided to the user.

In some embodiments, activity 440 can include using a chain-of-thought approach, which can involve breaking down the query into logical sub-components and addressing each in a structured sequence. For each sub-component, the system can identify relevant information from the top-scoring document chunks, summarize it, and then logically connect these summaries to build a comprehensive response. This step-by-step reasoning process can provide that the response is well-organized, addresses various aspects of the query, and maintains a clear logical flow from one point to the next.

In some embodiments, the LLM can be trained using multi-shot learning with multiple examples of high-quality legal responses, allowing it to learn patterns and structures common in effective responses. The system can apply this learned knowledge to generate responses that mimic the style, format, and reasoning approaches observed in the training examples. In some cases, the multi-shot learning can help to handle edge cases and can develop a more nuanced understanding of how to construct comprehensive and well-structured responses.

In a number of embodiments, method 400 additionally can include an activity 445 of transmitting the response to the user. Activity 445 can involve sending the generated response back to the user's device (e.g., 340 (FIG. 3)) for display on application 341 (FIG. 3) through frontend communication systems 314 (FIG. 3). The transmission process can include formatting the response appropriately for the user's interface, whether a web application, mobile app, or other platform. In many embodiments, the transmission can occur in real-time after receiving the query in activity 410.

Figure 5:
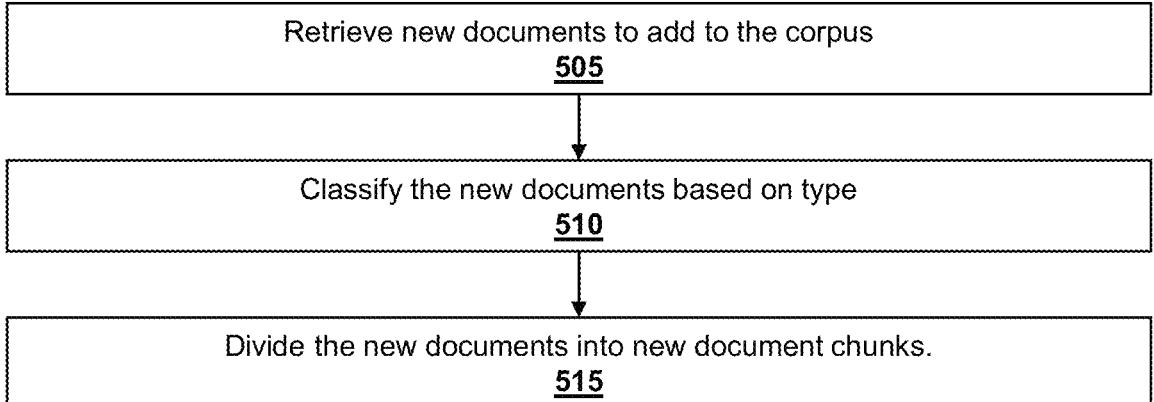
FIG. 5 illustrates a flowchart of activity of performing optional additional steps, according to an embodiment.

Turning ahead in the drawings, FIG. 5 illustrates a flowchart of activity 405 of performing optional additional steps, according to an embodiment. Activity 405 is merely exemplary and is not limited to the embodiments presented herein. Activity 405 can be employed in many different embodiments or examples not specifically depicted or described herein. In some embodiments, the procedures, the processes, and/or the activities of activity 405 can be performed in the order presented. In other embodiments, the procedures, the processes, and/or the activities of activity 405 can be performed in any suitable order. In still other embodiments, one or more of the procedures, the processes, and/or the activities of activity 405 can be combined or skipped.

Referring to FIG. 5, activity 405 can include an activity 505 of retrieving new documents to add to the corpus. In a number of embodiments, activity 505 can involve fetching new court docket and document publications from sources such as the PACER system. This activity can be performed periodically, continually, or as new documents become available to ensure the corpus remains up-to-date with the latest legal information.

In several embodiments, activity 405 also can include an activity 510 of classifying the new documents based on type. In several embodiments, activity 510 can involve using a machine-learning classification model to categorize each new document according to its type within the legal document hierarchy, such as described above. This classification process can analyze various aspects of the document, such as its structure, language patterns, and content, to determine its appropriate category.

In a number of embodiments, activity 405 further can include an activity 515 of dividing the new documents into new document chunks. In several embodiments, activity 515 can involve processing the newly classified documents to prepare them for storage and retrieval. This process can include extracting metadata, such as filing dates, and dividing the documents into logical chunks based on content structure or predefined criteria. These new document chunks can then be integrated into the existing document corpus, enabling their inclusion in future query responses.

In many embodiments, the techniques described can provide output that is far superior to current RAG systems.

For example, when a user asked "How is the Express, Inc. bankruptcy handling store-closures?", one leading platform responded as follows:

In the Express, Inc. bankruptcy case, the debtor is handling store closings by conducting going out of business (GOB) sales and subsequently rejecting the leases of the closed stores. This approach is typical in large commercial bankruptcies where the debtor has multiple retail locations. The debtor will file a motion requesting court authority to conduct these sales and to retain the services of a professional liquidator if necessary. The motion will also seek relief from any lease, state, or local restrictions on GOB sales <Link: Going Out of Business Sales in Bankruptcy>.

The process involves selling inventory free and clear of all liens and claims, abandoning certain property, and potentially paying employee incentive bonuses. The debtor may also need to solicit multiple bids and hold an auction for the right to liquidate the assets. this method allows the debtor to realize the value of the inventory at the unprofitable stores before rejecting the leases, thereby maximizing the estate's value for creditors <Link: Going Out of Business Sales in Bankruptcy>.

Content supporting AI-generated response:

<Link: Going Out of Business Sales in Bankruptcy>

For the same user query, "How is the Express, Inc. bankruptcy handling store-closures?", a second leading platform responded as follows:

As of my last update, Express, Inc. announced plans to close some of its stores as part of its bankruptcy proceedings. The company aimed to streamline operations and focus on its most profitable locations. Specific closures often depend on the financial performance of individual stores and overall market conditions.

Typically, during bankruptcy, companies may negotiate leases, close underperforming locations, and shift toward e-commerce to stabilize finances. For the most accurate and current details, checking Express's official announcements or news reports would be best.

These two outputs from current leading platforms had generic responses, either with no citation or an irrelevant citation. Overall, the responses were generalized and unhelpful.

By contrast, when asked the same user query, "How is the Express, Inc. bankruptcy handling store-closures?", a system implementing techniques described herein responded as follows:

Express has been implementing a strategic store closure plan as part of their bankruptcy restructuring:

1. The company identified approximately 95 underperforming stores for closure to focus on the remaining portfolio and invest capital into the stores that remained open [1].
2. As of May 31, 2023, Express had closed around 10 additional stores post-petition, and closed approximately 85 more stores in June 2024 [2].
3. The store closures are being conducted in collaboration with Hilco Merchant Resources, LLC (Hilco) [1].
4. On Apr. 24, 2024, the Bankruptcy Court approve the Store Closing Motion on an interim basis, and on May 15, 2024, approved it on a final basis [3].
5. The Store Closing Order authorized Express to conduct store closing sales free and clear or liens, claims, and encumbrances [3].

6. As part of the sale transaction approved on Jun. 14, 2024, Express retained over 450 store locations while closing the underperforming ones [4].
7. The closure of approximately 101 underperforming stores is expected to result in approximately $50 million in annual occupancy savings [4].
8. The company is authorized to transfer Store Closure Assets among closing stores and sell or abandon FF&E (furniture, fixtures, and equipment) in accordance with Consulting Agreement and Sale Guidelines [5] [6].

This store closure strategy is part of Express's broader efforts to rationalize their retail footprint, improve efficiency, and create a more profitable remaining store portfolio as they navigate through the bankruptcy process [2].

This example output also included citations for each of the listed footnotes (in brackets). Thes output provides thorough information that is accurate and timely, properly cited, and tuned for the audience.

As another example, the user can provide the following query: "When did the company file for bankruptcy" and the system implementing techniques described herein provided the following response, followed by the following citations:

Express, Inc. and its affiliated debtors filed for Chapter 11 bankruptcy on Apr. 22, 2024 (the "Petition Date") [1]. On this date, each debtor filed a voluntary petition for relief under chapter 11 of the Bankruptcy Code in the United States Bankruptcy Court for the District of Delaware [1]

[1] Chapter 11 Voluntary Petition. Fee Amount $1738. Filed by E . . . (Pages: 1, 2)
[2] Chapter 11 Voluntary Petition. Fee Amount $1738. Filed by E . . . (Page: 11)
[3] Chapter 11 Voluntary Petition. Fee Amount $1738. Filed by U . . . (Pages: 11, 12)
[4] Chapter 11 Voluntary Petition. Fee Amount $1738. Filed by E . . . (Pages: 14, 15)
[5] Chapter 11 Voluntary Petition. Fee Amount $1738. Filed by E . . . (Page: 11)
[6] Chapter 11 Voluntary Petition. Fee Amount $1738. Filed by E . . . (Page: 11)
[7] Notice of Meeting of Creditors/Commencement of Case Filed by . . . (Page: 3)
[8] Application/Motion to Employ/Retain Stretto, Inc. as Adminis . . . (Pages: 21, 22)
[9] Application/Motion to Employ/Retain Ernst & Young LLP as Tax . . . (Pages: 57, 58)
[10] Application/Motion to Employ/Retain Moelis & Company LLC as . . . (Pages: 3, 4)
[11] Application/Motion to Employ/Retain Moelis & Company LLC as . . . (Page: 100)
[12] Application/Motion to Employ/Retain Moelis & Company LLC as . . . (Page: 100)
[13] Order Authorizing Retention and Appointment of Stretto, Inc . . . (Pages: 6, 7)
[14] Order Authorizing Retention and Appointment of Stretto, Inc . . . (Page: 8)
[15] Order Authorizing and Approving the Employment and Retention . . . (Page: 121
[16] Order Authorizing and Approving the Employment and Retention . . . (Page: 131
[17] Affidavit/Declaration of Service re: Notice of Deadlines for . . . (Pages: 636, 637)
[18] Application for Compensation First Monthly Application of M3 . . . (Pages: 2//, 2/8)

[19] Exhibit(s)//Supporting Documentation Relating to Chapter 1 . . . (Page: 1)

[20] Exhibit(s)//Supporting Documentation Relating to Chapter 1 . . . (Page: 1)

[21] Motion to Approve//Debtors' Motion For Entry of an Order ( . . . (Page: 37)

[22] Chapter 11 Monthly Operating Report for Case Number 24-10840 . . . (Pages: 9, 10, 11, 12)

[23] Exhibit(s)//Supporting Documentation Relating to Chapter 1 . . . (Page: 1)

[24] Exhibit(s)//Supporting Documentation Relating to Chapter 1 . . . (Page: 1)

As a further example, the user can provide the following query: "What is the deadline for voting on the plan" and the system implementing techniques described herein provided the following response, followed by the following citations:

The deadline for voting on the plan (the "Voting Deadline") is Oct. 9, 2024, at 4:00 p.m., prevailing Eastern Time [1] [2] [3]. All Ballots must be properly executed, completed, and submitted so that they are actually received by the Solicitation Agent, Stretto, Inc., by this deadline [1] [3].

It's important to note that if a Ballot is received after the Voting Deadline, it may be counted only in the sole and absolute discretion of the Debtors [3]. Additionally, certain types of Ballots will not be counted, including those that partially reject and partially accept the Plan, are sent to incorrect parties, are illegible, or are unsigned [3].

The method of delivery of Ballots to the Solicitation Agent is at the election and risk of each Holder of a Claim. Holders should allow sufficient time to ensure timely delivery of their Ballots [3].

If you need more information or assistance with the voting process, you can contact Stretto, Inc., the voting and claims agent, by calling the Debtors' restructuring hotline at (855) 337-3537 (toll-free) or (949) 617-1363 (international), or by emailing ExpressBallotInquiries@stretto.com [4].

[1] Disclosure Statement//Disclosure Statement Relating to the . . . (Page: 72)

[2] Disclosure Statement//Disclosure Statement Relating to the . . . (Page: 32)

[3] Motion to Approve//Debtors Motion For Entry of an Order ( . . . (Pages: 63, 64)

[4] Motion to Approve//Debtors Motion For Entry of an Order ( . . . (Pages: 80, 81)

[5] Chapter 11 Voluntary Petition. Fee Amount $1738. Filed by E . . . (Pages: 1, 2)

[6] Notice of Meeting of Creditors/Commencement of Case Filed by . . . (Page: 3)

[7] Affidavit/Declaration of Service re: Notice of Deadlines for . . . (Pages: 636, 637)

[8] Disclosure Statement//Disclosure Statement Relating to the . . . (Pages: 48, 49)

[9] Disclosure Statement//Disclosure Statement Relating to the . . . (Pages: 72, 73)

[10] Motion to Approve//Debtors' Motion for Entry of an Order ( . . . (Pages: 122, 123)

[11] Motion to Approve//Debtors' Motion For Entry of an Order ( . . . (Pages: 19, 20)

[12] Motion to Approve//Debtors' Motion For Entry of an Order ( . . . (Page: 37)

[13] Motion to Approve//Debtors' Motion For Entry of an Order ( . . . (Pages: 44, 45)

[14] Motion to Approve//Debtors' Motion For Entry of an Order ( . . . (Pages: 45, 46)

[15] Motion to Approve//Debtors' Motion For Entry of an Order ( . . . (Pages: 4, 5)

[16] Motion to Approve//Debtors' Motion For Entry of an Order ( . . . (Page: 5)

[17] Motion to Approve//Debtors' Motion For Entry of an Order ( . . . (Page: 5)

[18] Motion to Approve//Debtors' Motion For Entry of an Order ( . . . (Pages: 76, 77)

[19] DELAWARE (Page: 56)

As yet another example, the user can provide the following query: "Do I need to file a proof of claim" and the system implementing techniques described herein provided the following response, followed by the following citations:

Whether you need to file a proof of claim depends on your specific situation:

If your claim is listed on the Debtors schedules and is not marked as disputed, contingent, or unliquidated, and you agree with the amount, nature, and priority of the claim as listed, you do not need to file a proof of claim [1].

However, if your claim is not listed on the schedules, or is listed as disputed, contingent, or unliquidated, you must file a proof of claim by the General Bar Date (Jul. 10, 2024 at 11:59 p.m., prevailing Eastern Time) for your claim to be allowed [2].

If you are a governmental unit, you have until the Governmental Bar Date (Oct. 22, 2024 at 11:59 p.m., prevailing Eastern Time) to file a proof of claim [2].

Certain parties are not required to file proofs of claim, including:

Entities whose claims have been previously allowed by order of the Court

Entities whose claims have been paid in full

Current employees of the Debtors, if an order of the Court authorized the Debtors to honor such claims in the ordinary course of business [3] [4] [5] [6] [1]

If you are unsure about whether you need to file a proof of claim, it is generally recommended to file one to ensure your claim is properly recognized in the bankruptcy proceedings [7].

If you decide to file a proof of claim, make sure to do so before the applicable bar date. Failure to timely file a proof of claim may result in your claim not being treated for purposes of voting and distribution in these Chapter 11 cases [8].

For specific legal advice regarding your individual circumstances, it is recommended that you consult with a qualified legal professional.

[1] Affidavit/Declaration of Service (Supplemental) re: Notice o . . . (Page: 13)

[2] Affidavit/Declaration of Service re: Notice of Deadlines for . . . (Pages: 636, 637)

[3] Affidavit/Declaration of Service (Supplemental) re: [Customi . . . (Page: 17)

[4] Affidavit/Declaration of Service (Supplemental) re: Notice o . . . (Page: 18)

[5] Affidavit/Declaration of Service (Supplemental) re: Notice o . . . (Page: 7)

[6] Affidavit/Declaration of Service (Supplemental) re: Notice o . . . (Page: 11)

[7] TITLE 11a—BANKRUPTCY RULES

[8] Affidavit/Declaration of Service (Supplemental) re: Notice o . . . (Pages: 9, 10)

[9] Chapter 11 Voluntary Petition. Fee Amount $1738. Filed by E . . . (Pages: 1, 2)

[10] Notice of Meeting of Creditors/Commencement of Case Filed by . . . (Page: 3)

[11] Motion to Approve//Debtors' Motion For Entry of an
    Order ( . . . (Page: 37)
[12] TITLE 11a—BANKRUPTCY RULES
[13] DELAWARE (Page: 42)
[14] TITLE 11—BANKRUPTCY (Pages: 179, 180)
[15] DELAWARE (Page: 4O)
[16] TITLE 11a—BANKRUPTCY RULES
[17] TITLE 11a—BANKRUPTCY RULES
[18] TITLE 11a—BANKRUPTCY RULES
[19] TITLE 11a—BANKRUPTCY RULES
[20] TITLE 11a—BANKRUPTCY RULES
[21] TITLE 11—BANKRUPTCY (Page: 180)
[22] TITLE 11a—BANKRUPTCY RULES
[23] TITLE 11a—BANKRUPTCY RULES
[24] TITLE 11a—BANKRUPTCY RULES Although the methods described above are with reference to the illustrated flowcharts, it will be appreciated that many other ways of performing the acts associated with the methods can be used. For example, the order of some operations may be changed, and some of the operations described may be optional.

In addition, the methods and system described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two. The media may include, for example, RAMs, ROMS, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

The foregoing is provided for purposes of illustrating, explaining, and describing embodiments of these disclosures. Modifications and adaptations to these embodiments will be apparent to those skilled in the art and may be made without departing from the scope or spirit of these disclosures.

Although systems and methods for fine-tuning classification and domain-specific taxonomical hierarchy in RAG pipelines for processing and analyzing documents has been described with reference to specific embodiments, it will be understood by those skilled in the art that various changes may be made without departing from the spirit or scope of the invention. Accordingly, the disclosure of embodiments of the invention is intended to be illustrative of the scope of the invention and is not intended to be limiting. It is intended that the scope of the invention shall be limited only to the extent required by the appended claims. For example, to one of ordinary skill in the art, it will be readily apparent that any element of FIGS. 1-5 may be modified, and that the foregoing discussion of certain of these embodiments does not necessarily represent a complete description of all possible embodiments.

Replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A computer-implemented method comprising:
receiving a query from a user related to legal information;
performing an initial retrieval of document chunks from a corpus of legal documents in response to the query;
applying a cross-encoder model to generate relevance scores for the document chunks;
filtering the document chunks based on a quality threshold;
calculating a combined score for each respective remaining document chunk of the document chunks based on a respective relevance score of the relevance scores, a temporal relevance score, and a document type importance score, wherein:
the document type importance score is based on applying an order of authority for legal document types;
applying the order of authority for legal document types comprises applying a hierarchy of legal authorities in which opinions and orders issued by judges carry higher authority than plans and disclosure statements, which carry higher authority than stipulations, motions, and applications, which carry higher authority than memoranda of law, affidavits, and reports, which carry higher authority than petitions, transcripts, and complaints, which carry higher authority than notices, exhibits, and responses; and
the temporal relevance score is calculated based on a court filing date for the respective remaining document chunk relative to a court filing date range for the document chunks in the initial retrieval;
selecting a subset of top-scoring document chunks based on the combined score; and
generating a response to the query based on the subset of the top-scoring document chunks.

2. The computer-implemented method of claim 1, wherein the cross-encoder model performs document-query matching to generate the relevance scores using cosine similarity.

3. The computer-implemented method of claim 1, wherein the respective relevance score is weighted higher than either of the temporal relevance score or the document type importance score.

4. The computer-implemented method of claim 1, wherein the respective relevance score is weighted higher than a combination of the temporal relevance score and the document type importance score.

5. The computer-implemented method of claim 1, wherein generating the response to the query based on the subset of the top-scoring document chunks comprises inputting the query, augmented with the subset of the top-scoring document chunks, into a large language model to generate the response to the query.

6. The computer-implemented method of claim 1 further comprising:

retrieving new legal documents to add to the corpus;

classifying the new legal documents based on type within the hierarchy of legal authorities; and dividing the new legal documents into new document chunks.

7. The computer-implemented method of claim 1 further comprising:

transmitting the response to the user.

8. A system comprising one or more processors and one or more non-transitory computer-readable media storing computing instructions that, when executed on the one or more processors, cause the one or more processors to perform operations comprising:

receiving a query from a user related to legal information;

performing an initial retrieval of document chunks from a corpus of legal documents in response to the query;

applying a cross-encoder model to generate relevance scores for the document chunks;

filtering the document chunks based on a quality threshold;

calculating a combined score for each respective remaining document chunk of the document chunks based on a respective relevance score of the relevance scores, a temporal relevance score, and a document type importance score, wherein:

the document type importance score is based on applying an order of authority for legal document types;

applying the order of authority for legal document types comprises applying a hierarchy of legal authorities in which opinions and orders issued by judges carry higher authority than plans and disclosure statements, which carry higher authority than stipulations, motions, and applications, which carry higher authority than memoranda of law, affidavits, and reports, which carry higher authority than petitions, transcripts, and complaints, which carry higher authority than notices, exhibits, and responses; and the temporal relevance score is calculated based on a court filing date for the respective remaining document chunk relative to a court filing date range for the document chunks in the initial retrieval;

selecting a subset of top-scoring document chunks based on the combined score; and generating a response to the query based on the subset of the top-scoring document chunks.

9. The system of claim 8, wherein the cross-encoder model performs document-query matching to generate the relevance scores using cosine similarity.

10. The system of claim 8, wherein generating the response to the query based on the subset of the top-scoring document chunks comprises inputting the query augmented with the subset of the top-scoring document chunks into a large language model to generate the response to the query.

11. The system of claim 8, wherein the respective relevance score is weighted higher than either of the temporal relevance score or the document type importance score.

12. The system of claim 8, wherein the respective relevance score is weighted higher than a combination of the temporal relevance score and the document type importance score.

13. The system of claim 8 further comprising:

retrieving new legal documents to add to the corpus;

classifying the new legal documents based on type within the hierarchy of legal authorities; and dividing the new legal documents into new document chunks.

14. The system of claim 8 further comprising:

transmitting the response to the user.

15. One or more non-transitory computer-readable media storing computing instructions that, when executed on one or more processors, cause the one or more processors to perform operations comprising:

receiving a query from a user related to legal information;

performing an initial retrieval of document chunks from a corpus of legal documents in response to the query;

applying a cross-encoder model to generate relevance scores for the document chunks;

filtering the document chunks based on a quality threshold;

calculating a combined score for each respective remaining document chunk of the document chunks based on a respective relevance score of the relevance scores, a temporal relevance score, and a document type importance score, wherein:

the document type importance score is based on applying an order of authority for legal document types;

applying the order of authority for legal document types comprises applying a hierarchy of legal authorities in which opinions and orders issued by judges carry higher authority than plans and disclosure statements, which carry higher authority than stipulations, motions, and applications, which carry higher authority than memoranda of law, affidavits, and reports, which carry higher authority than petitions, transcripts, and complaints, which carry higher authority than notices, exhibits, and responses; and the temporal relevance score is calculated based on a court filing date for the respective remaining document chunk relative to a court filing date range for the document chunks in the initial retrieval;

selecting a subset of top-scoring document chunks based on the combined score; and generating a response to the query based on the subset of the top-scoring document chunks.

16. The one or more non-transitory computer-readable media of claim 15, wherein the cross-encoder model performs document-query matching to generate the relevance scores using cosine similarity.

17. The one or more non-transitory computer-readable media of claim 15, wherein the respective relevance score is weighted higher than a combination of the temporal relevance score and the document type importance score.

18. The one or more non-transitory computer-readable media of claim 15, wherein generating the response to the query based on the subset of the top-scoring document chunks comprises inputting the query augmented with the subset of the top-scoring document chunks into a large language model to generate the response to the query.

19. The one or more non-transitory computer-readable media of claim 15, wherein the respective relevance score is weighted higher than either of the temporal relevance score or the document type importance score.

20. The one or more non-transitory computer-readable media of claim 15 further comprising:

retrieving new legal documents to add to the corpus;

classifying the new legal documents based on type within the hierarchy of legal authorities; and dividing the new legal documents into new document chunks.

\* \* \* \* \*